2,701,222

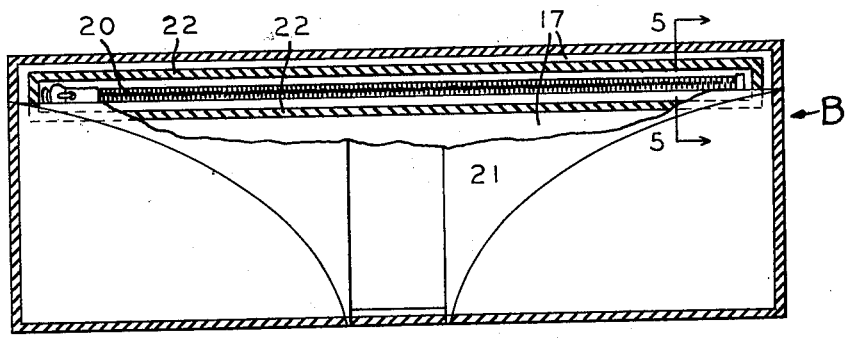
FIG. 1.
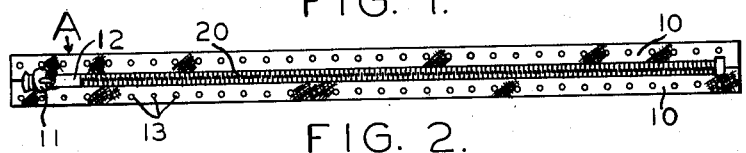
FIG. 2.
FIG. 3.
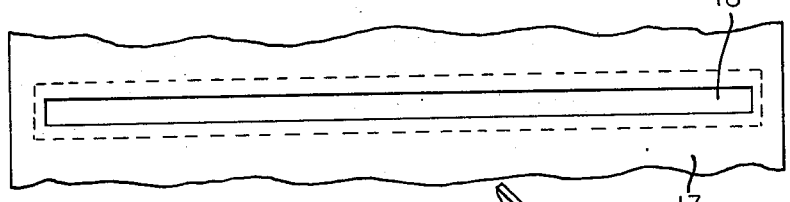
FIG. 4.
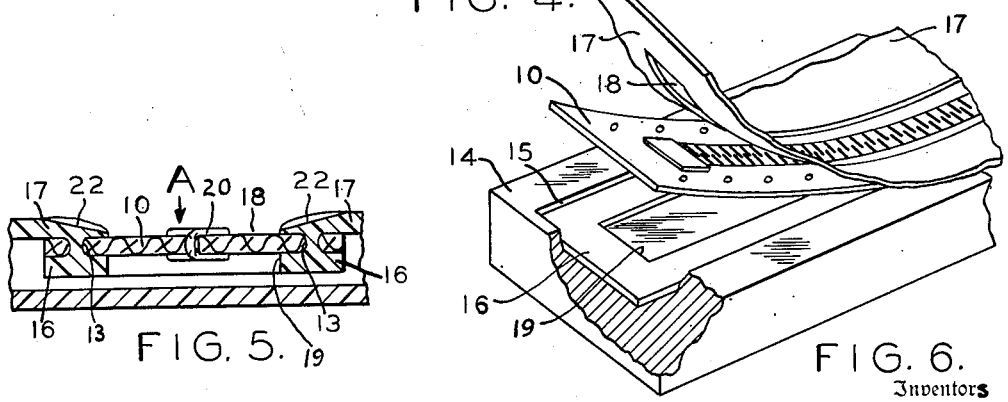
FIG. 5.
FIG. 6.
Inventors
GEORGE F. HETZEL
HENRY A. WILHELM
Attorney United States Patent Office 2,701,222
Patented Feb. 1, 1955

METHOD OF ATTACHING ZIPPERS TO A PLASTIC BODY

George F. Hetzel and Henry A. Wilhelm, St. Paul, Minn., assignors to Brown & Bigelow, St. Paul, Minn., a corporation of Minnesota Application April 5, 1951, Serial No. 219,340

2 Claims. (Cl. 154—116)

This invention relates to the method of fastening the zipper to a plastic body of sheet material without sewing the marginal edges of the fabric strip which carries the metal or plastic zipper and which ordinarily is secured to the body or member to which the zipper is to be attached by sewing the same thereto.

A feature resides in providing a zipper for plastic material which is used for various purposes such as billfolds, pocketbooks, wallets, key cases, and other articles which are designed to be made of plastic instead of fabric or leather, and in attaching the zipper unit in a manner so that a smooth beveled edge is obtained along the edge of the plastic which attaches to the fabric of the zipper.

Heretofore zipper units which are mounted on a fabric support have been attached to leather and other material where it is desired to use a zipper to open and close the edges of the members together, and it has been a general practice to sew the edge of the fabric which carries the zipper unit to the material to which the zipper unit is desired to be attached. We have found that this means of attaching is not satisfactory and is inclined to rip out under continuous use, and therefore we developed our method of attaching the zipper unit to the edges of the plastic which are adapted to be bound by the zipper and which method consists of forming a series of marginal holes along the fabric of the zipper unit and providing an understrip of sheet plastic which is of the same character as the surface plastic to which the zipper unit is to be attached, and then while the zipper is held in position to align the parts together, by means of heat sealing we weld the plastic through the marginal holes formed in the zipper fabric unit. The heat welding operation unites the edge of the plastic by extending through the holes and forcing the plastic into the weave of the fabric so as to virtually attach the plastic integrally to the fabric of the zipper unit. In our method we employ a simple means of securing the zipper unit to the plastic material to which it is desired to attach the zipper unit. The method is economical, and by means of heat, the edge of the plastic is welded to and through the fabric by reason of the marginal holes formed in the fabric, thereby forming a strong, virtually indestructible means of securing the zipper unit to the fabric.

A further feature of our method resides in forming a beveled edge along the edge of the plastic which extends right down to and virtually smooth with the surface of the fabric of the zipper unit which is very desirable; otherwise the edge of the plastic projects along the zipper unit and does not make a finished edge, but rather is inclined to catch against anything passing over the zipper. This is apparent when the zipper units are attached to plastic billfolds and the unstanding edge, where the zipper unit is sewed to the plastic, is inclined to catch anything which is being inserted into the pocket of the billfold.

A further feature of our means of attaching the zipper unit to the plastic resides in the economical manner in which the zipper may be attached. This is accomplished by providing template dies for holding the plastic and the zipper with our perforated marginal edge in proper position and then in applying a heat sealing die which squeezes the plastic edge down close to the fabric of the zipper, and further it causes the plastic material to flow through the holes and unite with the understrip of plastic so that the plastic extends through the holes and integrally unites in such a thorough manner that it is virtually impossible to pull the edge of the plastic away from the fabric of the zipper without destroying the character of the plastic. It will be apparent that a method of this character is extremely important in uniting the marginal edge of the fabric of the zipper to the edge of the plastic to which the zipper is being attached. It is also apparent that this operation of attaching the zipper fabric to the plastic in a single operation is economical in the saving of time, labor, and sewing material to attach the zipper unit, and the result is a stronger and more desirable finished article with the zipper unit attached to the plastic body.

The features together with further details and objects will be more fully and clearly hereinafter set forth.

In the drawing forming part of this specification:

Figure 1 shows the inside of a billfold to which the zipper unit has been attached by our method.

Figure 2 illustrates one of the first steps employed in carrying out our method wherein the fabric of the zipper is perforated marginally with a series of holes.

Figure 3 illustrates the understrip of plastic material which has been died out in the desired form so as to provide a frame of plastic lying beneath the zipper in carrying out our method.

Figure 4 illustrates a detail of the plastic material to which the zipper material is to be attached and indicates in dotted lines the position of the zipper in carrying out our method.

Figure 5 is an enlarged section on the line 5—5 of Figure 1.

Figure 6 is a perspective of a detail of the template die which supports the framework of plastic shown in Figure 3 which is positioned under the zipper unit and held in the template in proper position while a heat sealing die (not shown) is brought down on top of the outer surface of the plastic along the edges thereof to which the zipper unit is being attached by our method.

We have developed a very simple economical method of attaching the zipper unit to the edges of a plastic material which forms a strong durable connection between the fabric of the zipper unit and the edges of the plastic.

In carrying out our method we have illustrated the zipper unit A with its fabric support 10. The zipper unit A consists of a predetermined length of zipper material which is bound to adjacent edges of the fabric material 10 in the well known manner, and the key 11 which operates the zipper is pulled back and forth by the freely hung tongue 12 to provide an easy engagement and operation of the key 11. When the key is moved in one direction, it opens the zipper, and when it is moved in the other direction, it closes the zipper, all of which is well known in the use and operation of zippers for connecting two edges together.

One of the first steps of our method resides in punching a series of marginal holes 13 in the fabric 10 of the zipper A. After the fabric 10 has been perforated with the openings 13, the zipper A is ready to be attached to the plastic edges, either of a portion of the billfold such as B illustrated in Figure 1, or in the joining by zipper of the adjacent edges of any plastic material.

Heretofore the zipper A has been attached to the plastic material by sewing. We have found that sewing is not satisfactory for attaching a zipper unit to the edges of plastic material. The sewing will cut the edge of the plastic and will easily rip out, not by reason of the breaking of the sewing thread, but by reason of the fact that the thread cuts the plastic material between the stitches of the sewing, and thus the zipper becomes separated from the edges to which it is designed to be attached.

It is desirable to provide and use a template die 14 which is formed with a recess 15 in which the frame 16 of plastic is positioned or rests. After the plastic underframe 16 is in the template 14, the zipper unit A is placed upon the same as illustrated in Figure 6. The next step is to place the plastic sheet 17 on top of the zipper unit. The plastic sheet 17 is illustrated in Figure 4 and is formed with an elongated opening 18 which conforms to the opening 19 in the plastic frame 16 and which exposes the interlocking members 20 of the zipper so that the zipper key 11 may be operated by the tongue 12 when the zipper unit A is attached to the plastic sheet or member 17.

The member 17 represents the inside member 17 of the billfold B. A portion of the wall 21 in the billfold B is broken away to more clearly expose the edge of the portion 17 of the billfold to which the zipper unit A is attached when the billfold B is finished.

In Figure 6 I have diagrammatically illustrated the steps of the method which shows the lower plastic frame 16 resting in the template die 14 which may be made of metal or suitable material to hold the parts in alignment while heat is applied when welding the plastic sheet member 17 to the fabric portions 10.

The welding die (which is not shown in the drawings) is made up with an irregular surface, which surface is inclined like the half of a herringbone which makes inclined recesses 22 in the surface of the plastic against which the welding die bears.

The welding die is heated to a predetermined heat and is forced under pressure against the marginal surface about the entire opening 18 or in virtually the same pattern as the plastic frame 16 which lies beneath the marginal edge of the zipper A when these members are in the template die 14.

The welding of the zipper A to the marginal edges of the opening 18 of the member 17 is in one operation which extends around the entire margin of the opening 18 so that with a single welding operation the fabric of the zipper A is welded to the plastic frame member 16 which is positioned beneath the zipper, and the marginal edges of the opening 18 of the member 17 are welded and shaped in a manner to bevel the edge of the member 17 down to the fabric 10 of the zipper A as illustrated in Fig. 5. When this welding operation takes place, a portion of the plastic frame 16 extends up through the openings 13, and a portion of the lower surface of the member 17 around the margin thereof is forced down into the openings 13. When these two portions of the plastic members 16 and 17 meet, they are heat sealed together to make them integral, and thus they form integral plastic shafts or rod like portions which extend through the openings 13 of the zipper fabric 10, thereby permanently attaching the zipper to the plastic sheet 17. The under plastic frame member 16 acts like the head on a rivet, and when the welding die is forced against the marginal edges of the openings 13, the heat from the die travels through the openings 13 and softens the frame member 16 sufficiently to cause the plastic frame 16 to weld itself to the fabric 10 and to extend through the openings 13 thereof meeting the heated plastic from the member 17, and under these heated conditions the plastic is sealed to the fabric 10. The irregular surface of the fabric 10 also receives minute portions of the plastic as it is heat sealed or welded around the margin of the opening 18 and to the margin of the zipper fabric 10, thus securely attaching the zipper A to the plastic member 17 in such a manner that it is virtually impossible to remove the zipper from the plastic sheet or member 17 without destroying the same.

Therefore, it will be apparent that our method provides a simple inexpensive means of attaching the zipper A to a plastic sheet. Whether this plastic sheet is a portion of a billfold, such as is illustrated here, or is a portion of a portfolio or other article made out of plastic, the method of attaching the zipper is virtually identical, the principal object being to heat seal or weld the zipper to the plastic in virtually a single operation, and to provide a strong durable unit between the plastic and the fabric of the zipper.

Ordinary sewing by stitching the fabric of the zipper to the plastic sheet has been employed. However, this old method is unsatisfactory because the stitches tear through the plastic and the zipper becomes disengaged therefrom.

With our method we have developed a more economical means of attaching the zipper to the plastic as well as a very durable construction which insofar as we know will last as long as the plastic. The plastic material used for billfolds, key cases, portfolios and pocket memorandums is of a character that can be readily sealed or secured together by heat. In this manner the edges of the plastic sheets are sealed together, and when the sealing die is in the form illustrated (half of a herringbone design) it forms a decorative appearance around the edge of the article which is also true around the margin of the zipper.

It is apparent, however, that the welding die may be made in any design or form which acts to heat and weld the plastic together so as to integrally connect the plastic and thereby attach the zipper unit to the plastic sheet where it is desired.

We claim:

1. The method of securing a zipper unit formed with a key and interlocking closure members having fabric-like marginal support members to a top sheet having an opening consisting in forming a series of holes through the fabric-like support members of the zipper, then placing a plastic under-frame below said fabric marginal support of the zipper unit, then placing a plastic top sheet having an opening extending therethrough for the sliding of the zipper key on top of said fabric margin and clear of said zipper and key therefor, then heat sealing the under-frame plastic member to the marginal support plastic members causing the plastic from the respective plastic top sheet and under-frame members to flow into the holes in the zipper fabric-like marginal support members and unite with each other to provide a series of anchoring plastic members extending through the fabric-like marginal support members of the zipper and thereby attaching the zipper unit permanently to the plastic top sheet.

2. The method of attaching a zipper unit having fabric marginal pieces to a plastic sheet to form opening and closing means, consisting in forming an elongated hole through a plastic sheet with marginal edges thereabout, then providing a frame of plastic with an elongated hole like the hole provided in the plastic sheet, then perforating the marginal fabric of the zipper with a series of openings, then laying the plastic frame on one side of the fabric margin of the zipper, then heat-sealing the plastic sheet and plastic frame in a manner to cause portions of the frame and the plastic sheet to be integrally connected together through the fabric marginal pieces of the zipper.

References Cited in the file of this patent

UNITED STATES PATENTS

| Number | Name | Date |
|---|---|---|
| 2,048,895 | Rosen | July 28, 1936 |
| 2,056,856 | Hora | Oct. 6, 1936 |
| 2,338,535 | Pfleumer | Jan. 4, 1944 |
| 2,427,229 | Riley | Sept. 9, 1947 |
| 2,428,097 | Roslund | Sept. 30, 1947 |
| 2,470,251 | Kolbert et al. | May 17, 1949 |
| 2,475,277 | Budnick | July 5, 1949 |
| 2,504,705 | Lequillon | Apr. 18, 1950 |

FOREIGN PATENTS

| Number | Country | Date |
|---|---|---|
| 685,831 | Germany | Dec. 27, 1939 |